United States Patent [19]

Malinowski

[11] Patent Number: 5,450,994
[45] Date of Patent: Sep. 19, 1995

[54] MEASURING TAPE HOLDER WITH NOTCHED BACK PANEL AND RIVETED CLIP MEANS

[76] Inventor: Casimier L. Malinowski, 747 Warford Ave., Vallejo, Calif. 94590

[21] Appl. No.: 308,136

[22] Filed: Sep. 19, 1994

[51] Int. Cl.⁶ .............................................. A45F 5/00
[52] U.S. Cl. ..................... 224/252; 224/249; 224/904; 224/269; 24/10 A; D3/228
[58] Field of Search ............... 224/250, 251, 252, 253, 224/254, 255, 904, 242, 269, 270, 249, 222; D3/215, 218, 219, 228; 24/10 A, 3 F, 3 H

[56] References Cited

U.S. PATENT DOCUMENTS

| | | | |
|---|---|---|---|
| D. 280,863 | 10/1985 | Leath | D3/218 |
| D. 328,191 | 7/1992 | Reitz | D3/228 |
| 1,356,902 | 10/1920 | Benyei | 24/3 F |
| 4,119,249 | 10/1978 | Hanson | 224/253 |
| 4,619,020 | 10/1986 | Lecher, Sr. | 224/269 |
| 4,667,374 | 5/1987 | Bianchi | 224/252 |
| 4,757,927 | 7/1988 | Rutty | 224/904 |
| 4,821,933 | 4/1989 | Seber | 224/904 |
| 5,038,985 | 8/1991 | Chapin | 224/904 |
| 5,257,729 | 11/1993 | Silvernail | 224/222 |
| 5,341,975 | 8/1994 | Marinescu | 224/904 |
| 5,375,749 | 12/1994 | Oliva | 224/904 |

Primary Examiner—Henry J. Recla
Assistant Examiner—Gregory M. Vidovich
Attorney, Agent, or Firm—Harold D. Messner

[57] ABSTRACT

An auxiliary holder for a sprocketed measuring, tensionable measuring tape having a conventional clip with a free leg thereon comprising a back panel having top, bottom and side edges, a front panel connected to the back panel to thereby form a pocket therebetween having a first transverse opening, a rectangular notch formed in the back panel extending from the bottom edge and at least one clip attached to the back panel for attachment to an individual. Wherein, in use, the clip of the measuring tape is inserted into the first transverse opening of the pocket and the free leg disconnectably resides within the notch formed in the back panel.

21 Claims, 2 Drawing Sheets

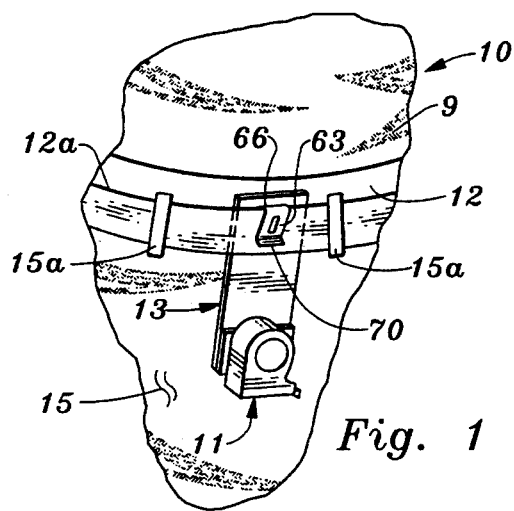
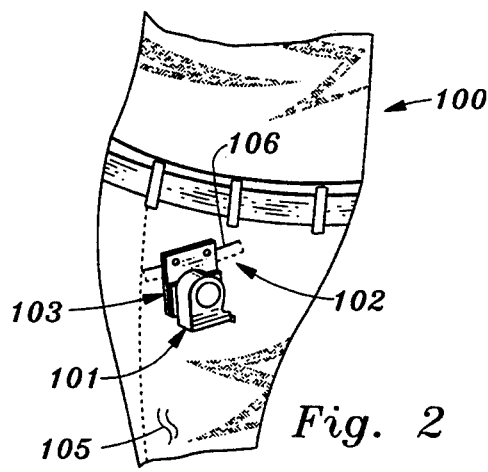
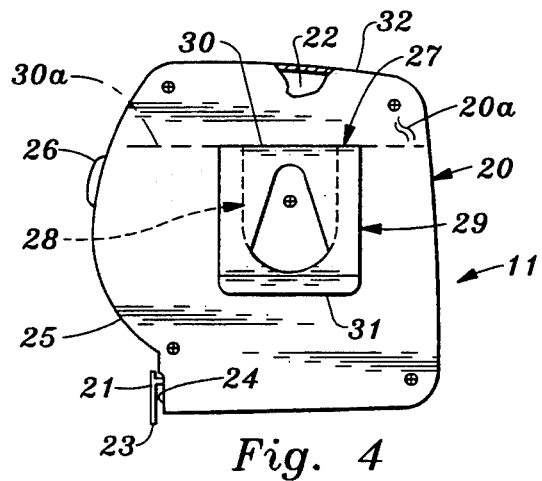
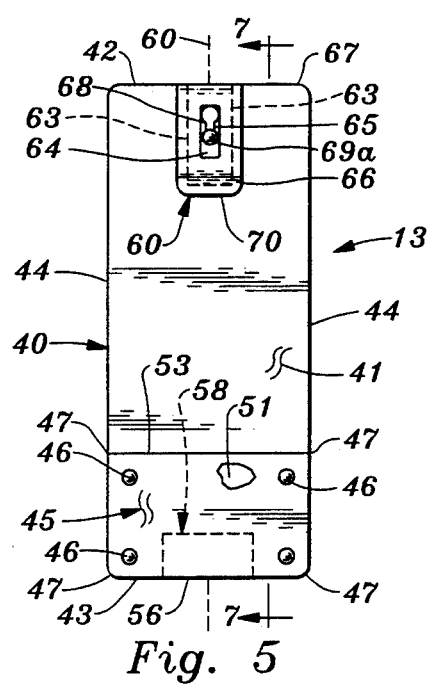
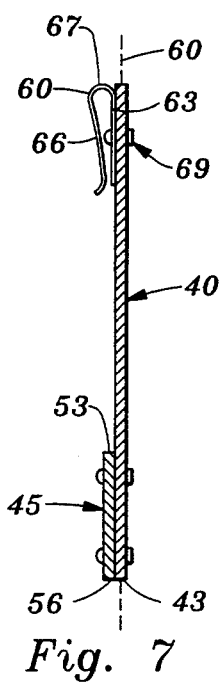
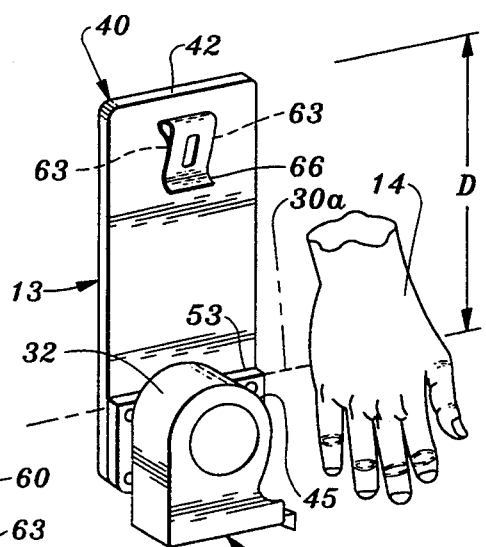
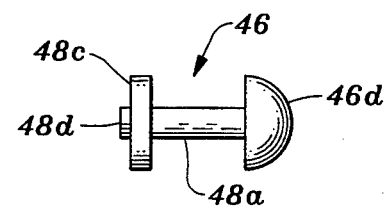

MEASURING TAPE HOLDER WITH NOTCHED BACK PANEL AND RIVETED CLIP MEANS

SCOPE OF THE INVENTION

The present invention relates to a holder for a spocketed measuring tape and more particularly to such a holder provided with a riveted planar front panel attached to a notched planar back panel which releasably accepts the conventional tear-drop shaped clip of such a measuring tape. Above the terminus of the front panel, the back panel is provided with a riveted clip means for securing the holder of the invention to the user's belt or pocket in a position adjacent to the hand of the user.

BACKGROUND OF THE INVENTION

Conventional spockerted measuring tapes include a cylindrical housing that confines a spired measuring tape within its cavity but permits the measuring tape to elongate through a radial opening connecting the cavity to the exterior, under tension, as shown in U.S. Pat. Nos. 3,905,114 and 4,434,952 incorporated herein by reference. A trigger locking stop permits the user to fix a given length of the tape exterior of the housing for measuring purposes. A tear-drop shaped clip is attached to the cylinder to permit such tape to be releasably attached to the belt or pocket of the user. Such clip has a fixed leg attached to the back side of the cylinder and a free leg that cantilevers from the fixed leg and a terminating tip bent under tension to rest against such back side for attachment purposes.

Experience has shown many circumstances in which such measuring tape is difficult to stay attached to the clothing of the user via such tear-drop shaped clip, say where the belt or pocket of the user is tight fitting or the user must bend many times at his waist during tasking operations. In this regard, the art is replete with auxiliary holders or aprons for retaining the measuring rule relative to the user's clothing. However, such auxiliary holders are relatively expensive to manufacture, especially if they include a separate belt; are awkward to use since they do not correctly position the measuring tape relative to the user's belt for easy insertion and retrieval; or do not easily attach or release the tape relative to the holder irrespective of the user's body position. An experienced carpenter usually has a set position for stowage of his measuring tape. If attached to his front pocket of his pants, the measuring tape extends down from the top flap a distance that places the tape adjacent to his hand when the latter is in a relaxed position at his side. If attached to his belt, it is desirable that the measuring tape be similarly positioned.

SUMMARY OF THE INVENTION

The present invention relates to an auxiliary holder for releasably stowage of a spockerted, tensionable measuring tape, comprising a back panel formed of leather or like material. The back panel is of a rectangular cross section and has a front surface terminating in top, bottom and side edges to which a front panel also of rectangular cross section, is attached. The front panel is located relative to the back panel between the side edges adjacent to the bottom edge of the back panel to form a tight-fitting pocket therebetween. Attachment of the front panel to the back panel is by means of four rivets placed adjacent to the corners of the front panel after the latter has been laid flat against the back panel, such rivets having shafts that extend through the panels and fasteners that attach to the shafts. A pocket thus defined located between the front and back panels, includes an opening at the transverse upper edge of thickness T over which the tip of the conventional tear-drop shaped clip of the measuring tape releasably attaches where T is about ⅛ inch. The back panel also includes a rectangular notch or opening, such notch being bisected by a longitudinal axis of symmetry of the holder and being dimensioned to slidably accept the cantilevered leg of the tear drop shaped clip of the measuring tape for stowage therein. That is, the width W1 of the rectangular notch or opening in the back panel is engineered to permit entry of the edges of the cantilevered leg of the tear drop shaped clip of the measuring tape therein but wherein the holder itself is attached to the user's body such that the upper surface of the measuring tape is positioned adjacent to the hand of the user, when the user's arm is positioned at his side.

That is, the measuring tape is positioned within the holder of the invention such that a distance D is defined between tear-drop shaped clip of the measuring tape (coincident with the upper transverse edge of the pocket of the holder) and the top edge of the back panel so as to place the measuring tape adjacent to his hand when the latter is in a relaxed position at his side.

Attachment of the holder to the user's body is via clip means riveted to the back panel of the holder near its top edge.

One embodiment of the invention uses the user's belt as the fastening post wherein attachment occurs by means of a single clip of tear-drop shaped cross section that is similar to that of the measuring tape. The tear-drop shaped clip of the holder is riveted to the front surface of the back panel in a vertical position above the pocket formed by the front and back panels of the holder adjacent to the top edge of the back panel. In such position, the distance D is about 4½ inches and correctly positions the measuring tape adjacent to the user's hand. Attachment occurs as follows: the user first inserts the clip between his belt and his clothing and then pushes same upward until the tip of the cantilevered leg clears the top edge of the user's belt. Then he pulls the holder and clip downward so that the fixed and cantilevered legs of the clip slidably attached to the front and back surfaces of the belt. Additional frictional attaching forces are seen to act between the belt, the back panel and the user's clothes to assure that the holder does not become dislodged from the belt during normal tasking operations.

Another embodiment of the invention uses the user's front pocket of his pants or coveralls wherein attachment occurs by means of two clips of tear-dropped cross section riveted to the back surface of the back panel in a vertical position above the pocket formed by the front and back panels of the holder. In such position, the distance D is about 2 inches and correctly positions the measuring tape adjacent to the user's hand. Attachment occurs as follows: the user first rises the tips of both clips above the upper edge of the front pocket of the user's pants or coveralls and then pushes same downward so that the fixed and cantilevered legs of the clip slidably attached to the interior surface of such front pocket, i.e., within the cavity of the front pocket. Additional frictional attaching forces occur because of the use of two clips and by the fact that rivet heads attaching the clips to the holder are positioned and the tips of the clips pinch a segment of the user's front pocket to place such segment under tension to assure that the holder does not become dislodged from the pocket.

BRIEF DESCRIPTION OF DRAWINGS

FIG. 1 is a partial side view of a user of the invention showing the position of a conventional sprocketed measuring tape in attachment within one embodiment of the holder of the invention, such holder being attached to the user's belt;

FIG. 2 is a second partial side view of the user of FIG. 1, showing the position of a conventional sprocketed measuring tape in attachment within a second embodiment of the holder of the invention, such holder being to a front pocket of user's pants;

FIG. 3 is a detail perspective view of the measuring tape and holder of FIG. 1;

FIG. 4 is a detail side view, partially cutaway, of the measuring tape of FIG. 1 in which the tape has been rotated 180 degrees so as to shown a tear-drop shaped clip;

FIG. 5 is a front plan view of the holder of FIG. 1;

FIG. 7 is section taken along line 7—7 of FIG. 5;

FIG. 8 is a detail side view of a pop rivet used in the manufacture of the holder of FIG. 5;

DETAILED DESCRIPTION OF THE INVENTION

Figure 6:
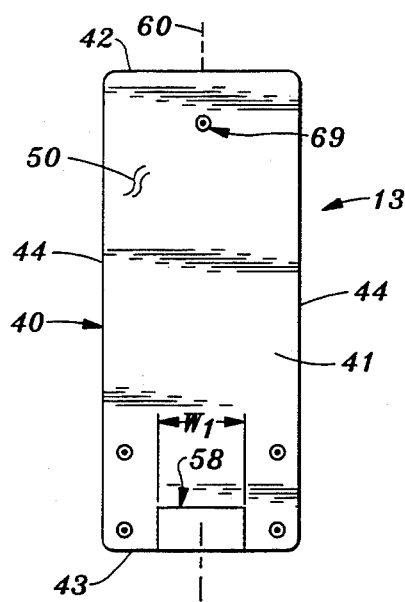
FIG. 6 is a rear plan view of the holder of FIG. 1.

With reference to FIGS. 1 and 3, a portion of torso 9 of a user 10 is shown in which a conventional spocketed measuring tape 11 is attached, say to his belt 12 via auxiliary holder 13 of the invention. As shown in FIG. 3, the user's hand 14 hangs adjacent to the measuring tape 11. The user's belt 12 is attached to the user's clothing, say a pair of pants 15 via belt loops 15a.

FIGS. 3 and 4 shows the measuring tape 11 in detail. As shown, the measuring tape 11 includes a cylindrical housing 20 that confines a spired measuring reel 21 within its cavity 22 but permits tip 23 of the measuring reel 21 to elongate through a radial opening 24 connecting the cavity 22 exterior of side edge under tension, as shown in U.S. Pat. Nos. 3,905,114 and 4,434,952 incorporated herein by reference. A trigger stop 26 permits the user to fix a given length of the tape 21 exterior of the housing 20 for measuring purposes. A clip 27 is attached to the cylindrical housing 20 to permit tape 11 to be releasably attached to the belt 12 of the user 10, FIG. 1. Such clip 27 is tear-drop shaped in cross section with a fixed leg 28 attached to back side 20a of the housing 20 and a free leg 29 that cantilevers from a common junction 30 having a transverse axis 30a, such cantilevered leg 29 having a tip 31 bent under tension to rest against such back side 20a of the housing 20 for attachment purposes.

FIGS. 5-7 show auxiliary holder 13 in more detail.

As shown, the auxiliary holder 13 includes a back panel 40 formed of leather of rectangular cross section. Such back panel 40 includes having a front surface 41 terminating in top, bottom and side edges 42, 43, and 44, respectively, to which a front panel 45 also of rectangular cross section, is attached. A rear surface 50 of the back panel 40 is of similar dimensions as the front surface 41 and terminates in the top, bottom and side edges 42, 43, 44 in similar manner.

Front panel 45 is attached to the back panel 40 between the side edges 44 adjacent to the bottom edge 43 of the back panel 40 to form a pocket 51 therebetween. Attachment of front panel 45 to the back panel 40 is by means of four pop rivets 46 placed adjacent to four corners 47. As shown in FIG. 8, each of such rivets 46 has a shaft 48a, a head 48b and washer fastener 48c. Each of the rivets 46 extends through the front surface 41 of the back panel 40 and then is attached at an enlarged end 48d via washer fastener 48c. The pocket 51 thus defined includes an opening at transverse upper edge 53 of thickness T where T is about ⅛ inch. The pocket 51 also includes a second opening at a transverse lower edge 56 of the front panel 45 which is coincident with the bottom edge 43 of the back panel 40. A rectangular notch or opening 58 is also formed in the back panel 40, such notch 58 being bisected by a longitudinal axis of symmetry 60 of the holder 13. The notch 58 and transverse upper edge 53 are dimensioned to aid in the releasable acceptance of the measuring tape 11 of FIG. 4. That is, the transverse edge 53 of the front panel 45 is engineered so that the tip 31 of the clip 27 of the measuring tape 11, see FIG. 4 can slide thereover to be releasably attached relative to the holder 13. And the notch 58 is formed to slidably accept the cantilevered leg 29 of the same clip 27 for stowage therein. Thus, width W1 of the rectangular notch 58 in the back panel 40 is engineered to permit entry of cantilevered leg 29 of the clip 27, therein but wherein the holder 13 itself is attached such that upper surface 32 of tape 11 is positioned adjacent to the user's hand 14, the latter is positioned at his side, see FIG. 3. That is, referring to FIGS. 3 and 4, the topmost surface 32 of the measuring tape 11 is positioned within the holder 13 of the invention such that a distance D is defined between the transverse axis 30a of the junction 30 between the fixed and free legs 28, 29 of the clip 27 of the measuring tape 11 (such axis 30a being coincident with the transverse upper edge 53 of the pocket 51), and the top edge 42 of the back panel 40 so as to place such topmost surface 32 adjacent to his hand 14 when the latter is in a relaxed position at the side of the user. In this regard, D is equal to about 4½ inches.

Returning to FIGS. 5-7, attachment of the holder 13 to the user is via clip means 60 riveted to the back panel 40 near its top edge 42, such clip means 60 including a single clip. Such single clip 60 is of tear-dropped cross section having a fixed leg 63 defining a broad surface 64 having a slot 65 and another leg 66 that cantilevers from common apex 67. Note that such cantilevered leg 66 also has a transverse oval slot 68 therein to permit a rivet fastener 69a to be attached to pop rivet 69, such rivet 69 securing the clip 60 relative to back panel 40. Cantilevered leg 66 also includes a tip 70 bent inward toward the rivet 69 to provide a gripping force between such tip 70 and the front surface 41 of the back panel 40 so as to provide attachment.

In such position, as shown in FIG. 3, proper relationship between the user's hand 14 and the measuring reel 11 is provided. Attachment of the measuring tape 11 and holder 13 of FIGS. 1 and 3 occurs as follows: the user 10 first takes the holder 13 in his hand 14 and pushes the holder 13 upwardly between his belt 12 and his pants 15, between adjacent belt loops 15a until the tip 70 of the cantilevered leg 66 is above top edge 12a of the user's belt 12. Then the user 10 pulls the holder 13 downward so that the fixed and cantilevered legs 63, 66 of the clip 61 slidably attaches to front and back surfaces of the belt 12. Additional frictional attaching forces are seen to act between the belt 12, the back panel 40 and the user's pants 15 that lay between adjacent belt loops 15a to assure that the holder 13 does not become dislodged from the belt 12 during normal tasking operations.

ALTERNATE EMBODIMENT

FIGS. 2, 9-13 show an alternate embodiment of the invention.

Figure 9:
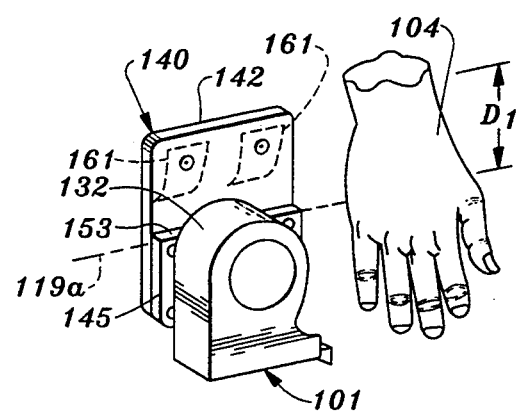
FIG. 9 is a detail perspective view of the measuring tape and holder of FIG. 2.

In FIGS. 2 and 9, a user 100 is shown in which a conventional spocketed measuring tape 101 is attached to the user's front pocket 102 via an alternative auxiliary holder 103 of the invention. The user's hand 104 hangs adjacent to the measuring tape 101.

Figure 10:
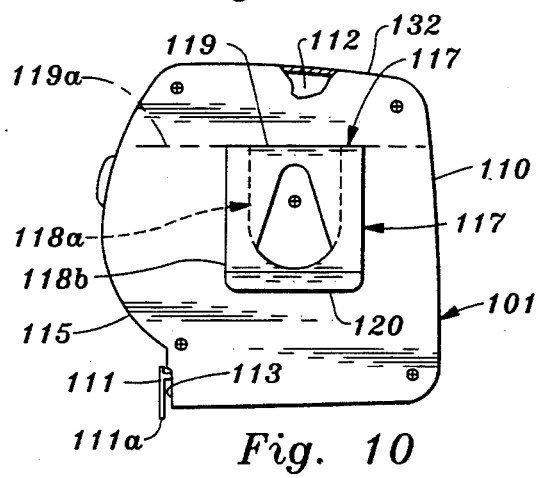
FIG. 10 is a detail side view, partially cutaway, of the measuring tape of FIG. 2 similar to that shown in FIG. 4.

FIG. 10 shows the measuring tape 101 in detail and is similar to that depicted in FIG. 4. Suffice it to say the tape 101 includes a housing 110, a spired measuring tape reel 111 within its cavity 112, such reel 111 having a tip 111a penetrating through a radial opening 113 connecting the cavity 112 exterior of side edge 1155, under tension. A clip 117 is attached to the cylindrical housing 110 to permit such tape 101 to be releasably attached to the belt 102 of the user 100. Such clip 117 is teardropped shaped in cross section and is the same as previously described, including a fixed leg 118a attached to housing 110 and a free leg 118b that cantilevers from junction 119 having transverse axis 119a, such cantilevering free leg 118b having a tip 120 bent under tension to rest against such housing 110 but movable in an opposite direction to permit insertion of a fixed element, such as holder 103 for attachment purposes therebetween.

Figure 11:
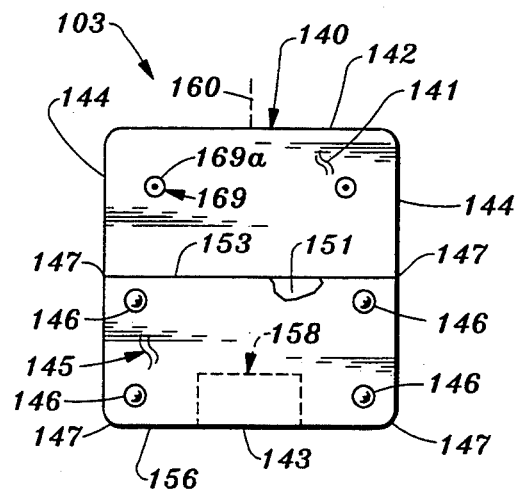
FIG. 11 is a front plan view of the holder of FIG. 2.
Figure 12:
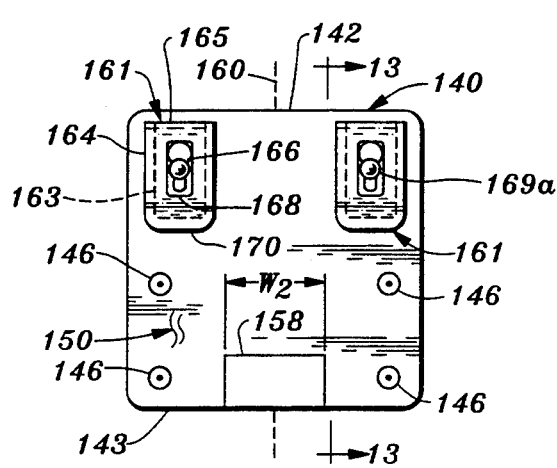
FIG. 12 is a rear plan view of the holder of FIG. 2.
Figure 13:
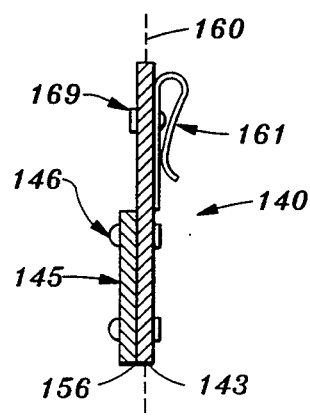
FIG. 13 is section taken along line 13—13 of FIG. 12.

FIGS. 11-13 show auxiliary holder 103 in more detail. As shown, the auxiliary holder 103 includes a back panel 140 formed of leather of rectangular cross section. Such back panel 140 includes having a front surface 141 terminating in top, bottom and side edges 142, 143, and 144, respectively, to which a front panel 145 also of rectangular cross section, is attached. A rear surface 150 of the back panel 140 is of similar dimensions as the front surface 141 and terminates in the top, bottom and side edges 142, 143, 144 in similar manner.

Front panel 145 is located relative to the back panel 140 between the side edges 144 adjacent to the bottom edge 143 of the back panel 140. Its attachment to the back panel 140 is by means of four rivets 146 placed adjacent to four corners 147 of the front panel 145, such rivets 146 as similar to that depicted in FIG. 8. A pocket 151 thus defined is located between the back and front parcels 140, 145 and includes an opening at transverse upper edge 153. The pocket 151 also includes a second opening at a transverse lower edge 156 of the front panel 145 which is coincident with the bottom edge 143 of the back panel 140. A rectangular notch or opening 158 is formed in the back panel 140, such notch 158 being bisected by a longitudinal axis of symmetry 160 of the holder 103. The notch 158 and transverse upper edge 153 are dimensioned to aid in the releasable acceptance of the measuring tape 101 of FIG. 9. That is, the transverse edge 153 of front panel 145 is engineered so that the tip 120 of the clip 117 of measuring tape 101, see FIG. 10 can slide thereover to be releasably attached relative to the holder 103. And the notch 158 is formed to slidably accept the cantilevered leg 118b of the same clip 117 for stowage therein. Thus, the width W2 of the rectangular notch or opening 158 in the back panel 140 is engineered to permit entry of cantilevered leg 118b of the clip 117, therein but wherein the holder 103 itself is attached such that upper surface 132 is positioned adjacent to the hand 104 of the user, when the latter is positioned at his side, see FIG. 9. That is, referring to FIGS. 2 and 9, the topmost surface 132 of the measuring tape 101 is positioned within the holder 103 of the invention such that a distance D1 is defined between the transverse axis 119a of the junction 119 between the fixed and free legs 118a, 118b of the clip 117 of the measuring tape 101 (such axis 119a being coincident with the transverse upper edge 153 of the pocket 151), and top edge 142 of the back panel 140 so as to place such topmost surface 132 adjacent to his hand 104 when the latter is in a relaxed position at the side of the user. In this regard, D1 is equal to about 2 inches.

Returning to FIGS. 11-13, attachment of the holder 103 to the user 100 is via clip means 161 riveted to the back panel 140 near its top edge 142, such clip means 161 including a pair of transversely aligned clips, each being of a tear-dropped cross section and having a fixed leg 163 and a cantilevered free end 164 that depends from the fixed leg 163 from a common apex or junction 165. Within the fixed leg 163 is a slot 166 extending through a broad surface. Note that such cantilevered leg 164 also has a transverse oval slot 168 therein to permit a rivet fastener 169a to be attached to rivet 169, such rivet 169 securing each of the clips 161 relative to back panel 140. Each cantilevered leg 164 also includes a tip 170 bent inward toward the rivet 169 to provide a gripping force between such tip 170 and the front surface 141 of the back panel 140 so as to provide attachment. Attachment of the measuring tape 101 and holder 103 to the user 100 of FIG. 2 occurs as follows: the user 100 uses his front pocket 102 of his pants or coveralls 105 for such purpose wherein attachment of the measuring tape 101 and holder 103 occurs by means of the clips 161 previously described in detail attached to top edge 106 of the pocket 102. In such position, the measuring tape 101 is correctly positioned adjacent to the user's hand 104. Attachment occurs as follows: the user 100 first rises the tips 170 of both clips 161 above top edge 106 of the front pocket 102 of the user's pants or coveralls 105 and then pushes same downward so that their fixed and cantilevered legs 163, 164 slidably attached to the interior surface of front pocket 102. Additional frictional attaching forces occur because of the use of two clips 161 and by the fact that rivet fasteners 169a attaching the clips 161 to the holder 103 of the invention, are positioned such that they and the associated tips 170 pinch a segment of the user's front pocket 102 to place such segment under tension to assure that the holder 103 does not become dislodged from the pocket 102.

Other embodiments and modifications of the invention will readily come to those of ordinary skill in the art having the benefit of the teachings present in this description and drawings. It is therefore to be understood that such various changes are to be considered within the principles and scope of the invention.

What is claimed is:

1. A holder for a sprocketed measuring tape comprising a planar back panel of rectangular cross section having a front surface terminating in top, bottom and side edges, a front panel also of rectangular cross section, attached to said back panel to form a tight-fitting pocket therebetween at a position between said side edges but adjacent to said bottom edge of said back panel, a series of rivets for attaching said front and back panels together and forming said tight-fitting pocket therebetween, and tear-dropped shaped clip means attached to said back panel adjacent to said top edge of said back panel for releasably attachment of said holder relative to a user, said pocket including a first transverse opening located between said top and bottom edges of said back panel, and a second transverse opening positioned adjacent to said bottom edge of said back panel, said back panel including a rectangular notch formed therein having an opening starting at said bottom edge of said back panel and terminating in side and end walls defining dimensions that permit a cantilevered free leg of a conventional tear-dropped clip of a sprocketed measuring tape to disconnectably reside therein when said conventional clip is inserted into said pocket through said first transverse opening.

2. The holder of claim 1 in which said series of rivets for attaching said front and back panels together, are placed adjacent to corners of said front panel after said front panel has been laid at against said front surface of said back panel, and each of said rivets includes a shaft having a head on one end and an enlarged end on the opposite end thereof that extends through both said front and back panels, and a first fastener that attaches about said enlarged end of said shaft.

3. The holder of claim 1 in which said tear-drop shaped clip means for attaching said holder relative to a user comprises a single clip positioned adjacent to said top edge of said back panel including a fixed leg rivetally attached to said back panel and a cantilevered free leg integrally attached to said fixed leg at a common transverse junction, said free leg cantilevering from said fixed leg to define a terminating portion tip bent under tension to rest against said back panel but movable therefrom in an opposite direction for attachment to a belt of said user.

4. The holder of claim 1 in which tear-drop shaped clip means for attaching said holder relative to a user comprises a pair of side-by-side tear-drop shaped clips positioned adjacent to said top edge of said back panel wherein each of said clip means includes a fixed leg rivetally attached to said back panel and a cantilevered free leg integrally attached to said fixed leg at a common transverse junction, said free leg cantilevering from said fixed leg to define a terminating portion bent under tension to rest against said back panel but movable therefrom in an opposite direction for attachment to a pocket in clothes of said user.

5. The holder of claim 3 in which said side walls of said notch defines a width W that is slightly larger than a transverse dimension of said free cantilevered leg of said conventional tear-dropped clip of said measuring tape.

6. The holder of claim 4 in which said side wall of said notch defines a width W that is slightly larger than a transverse dimension of said free cantilevered leg of said conventional tear-dropped clip of said measuring tape.

7. In releasable carriage of a tool by a user, the combination comprising a sprocketed measuring tape comprising a cylindrical housing having a central cavity, a spired measuring tape releasably positioned within said cavity, and a clip attached to an exterior surface of said housing, said clip of tear-dropped cross section including fixed and free legs integrally attached at a common transverse junction, said free leg cantilevering from said fixed leg to define a terminating tip bent under tension to rest against the housing but movable therefrom in an opposite direction, a holder for said sprocketed measuring tape comprising a planar back panel of rectangular cross section having a front surface terminating in top, bottom and side edges, a front panel also of rectangular cross section, attached to said front surface of said back panel, at a position between said side edges but adjacent to said bottom edge of said back panel to form a tight-fitting pocket therebetween, a series of rivets placed for attaching said back and front panels together, and tear-dropped shaded clip means attached to said back panel adjacent to said top edge of said back panel for releasable attachment of said holder relative to a user, said pocket including a first transverse opening located between said top and bottom edges of said back panel, said back panel including a rectangular notch formed therein having an opening starting at said bottom edge of said back panel and terminating in side and end walls defining dimensions that permit said tear-dropped clip of said sprocketed measuring tape to disconnectably reside therein when said clip attached to said housing is inserted into said pocket through said first transverse opening.

8. The combination of claim 7 in which said series of rivets for attaching said front and back panels together, are placed adjacent to corners of said front panel after said front panel has been laid flat against said front surface of said back panel, and each of said rivets includes a shaft having a head on one end and an enlarged end on the opposite end thereof that extends through both said front and back panels, and a first fastener that attaches about said enlarged end of said shaft.

9. The combination of claim 7 in which tear-drop shaped clip means for attaching said holder relative to a user comprises a single clip positioned adjacent to said top edge of said back panel including a fixed leg rivetally attached to said back panel and a cantilevered free leg integrally attached to said fixed leg at a common transverse junction, said free leg cantilevering from said fixed leg to define a terminating portion bent under tension to rest against said back panel but movable therefrom in an opposite direction for attachment to a belt of said user.

10. The combination of claim 7 in which tear-drop shaped clip means for attaching said holder relative to a user comprises a pair of side-by-side tear-drop shaped clips positioned longitudinally adjacent to but parallel with said top edge of said back panel wherein each includes a fixed leg rivetally attached to said back panel and a cantilevered free leg integrally attached to said fixed leg at a common transverse junction, each of said free legs cantilevering from said fixed leg to define a terminating portion bent under tension to rest against said back panel but movable therefrom in an opposite direction for attachment to a pocket in clothes of said user.

11. The combination of claim 9 in which said side wall of said notch defines a width W that is slightly larger than a transverse dimension of said free cantilevered leg of said conventional tear-dropped clip of said measuring tape.

12. The combination of claim 9 with the addition of a single rivet for attaching said single tear-shaped clip relative to said front surface of said back panel.

13. The combination of claim 10 with the addition of a pair of rivets for respectively attaching said pair of tear-drop shaped clips relative to a back surface of said back panel, said back surface being opposite to said front panel and said pocket formed between said front and back panels.

14. The combination of claim 12 in which said fixed leg of said single tear-dropped shaped clip of said holder includes a tear-drop shaped opening to receive said single rivet at a position having an axis normal to said back panel that is at a height H below said junction of said clip of said holder.

15. The combination of claim 13 in which each of said fixed legs of said pair of tear-dropped shaped clips includes a tear-drop shaped opening to receive one of said pair of rivets at a position having an axis normal to said back panel that is at a height H below said junction of each of said pair of clips of said holder.

16. The combination of claim 14 in which H is about ½ inch.

17. The combination of claim 15 in which H is about ½ inch.

18. The combination of claim 9 in which an upper edge of said front panel adjacent said first transverse opening of said pocket is of thickness T over which said portion of said tear-dropped shaped clip of the measuring tape slidably mates when inserted into said pocket prior to said clip of said measuring tape residing within said rectangular notch in said back panel and wherein a vertical distance D is defined between said top edge of said back panel and said junction of said tear-dropped shaped clip of said measuring tape.

19. The combination of claim 10 in which an upper edge of said front panel is of thickness T over which said portion of said tear-dropped shaped clip of the measuring tape slidably mates when inserted into said pocket prior to said clip of said measuring tape residing within said rectangular notch in said back panel and wherein a vertical distance D is defined between said top edge of said back panel and said function said tear-dropped shaped clip of said measuring tape.

20. The combination of claim 18 in which T is about ⅛ inch and D is about 4½ inches so as to place said measuring tape adjacent to a hand of said user when the latter is in a relaxed position at his side.

21. The combination of claim 19 in which T is about ⅛ inch and D is about 2 inches so as to place said measuring tape adjacent to a hand of said user when the latter is in a relaxed position at his side.

* * * * *